(12) United States Patent
Houzumi et al.

(10) Patent No.: US 9,780,506 B2
(45) Date of Patent: Oct. 3, 2017

(54) BUS BAR UNIT

(71) Applicant: KAYABA INDUSTRY CO., LTD., Minato-ku, Tokyo (JP)

(72) Inventors: Nobuji Houzumi, Kanagawa (JP); Tarou Matsumae, Kanagawa (JP); Yoshiteru Kurokawa, Kanagawa (JP); Suguru Sakamoto, Kanagawa (JP); Tohru Takimoto, Fukui (JP); Shingo Yamada, Fukui (JP)

(73) Assignee: KYB Corporation, Tokyo (JP)

( * ) Notice: Subject to any disclaimer, the term of this patent is extended or adjusted under 35 U.S.C. 154(b) by 355 days.

(21) Appl. No.: 14/436,083

(22) PCT Filed: Jan. 24, 2014

(86) PCT No.: PCT/JP2014/051516
§ 371 (c)(1),
(2) Date: Apr. 16, 2015

(87) PCT Pub. No.: WO2014/136492
PCT Pub. Date: Sep. 12, 2014

(65) Prior Publication Data
US 2015/0295371 A1    Oct. 15, 2015

(30) Foreign Application Priority Data

Mar. 8, 2013 (JP) .................................. 2013-047252

(51) Int. Cl.
*H02K 11/00*    (2016.01)
*H02K 3/04*    (2006.01)
(Continued)

(52) U.S. Cl.
CPC ....... *H01R 25/161* (2013.01); *B29C 45/1459* (2013.01); *B29C 45/14065* (2013.01);
(Continued)

(58) Field of Classification Search
CPC .......... H02K 11/00; H02K 3/04; H01R 25/00; H01R 31/00
(Continued)

(56) References Cited

FOREIGN PATENT DOCUMENTS

EP      2139098 A2 * 12/2009  ............. H02K 3/522
JP    2003-134728 A    5/2003
(Continued)

OTHER PUBLICATIONS

International Search Report and Written Opinion mailed May 13, 2014 corresponding to International application No. PCT/JP2014/051516.

*Primary Examiner* — Jose Gonzalez Quinones
(74) *Attorney, Agent, or Firm* — Hauptman Ham, LLP

(57) ABSTRACT

In a bus bar unit formed by performing secondary insert molding on a primary molded member, which is formed by performing primary insert molding on a plurality of primary molding bus bars, and a plurality of secondary molding bus bars such that the primary molding bus bars and the secondary molding bus bars are arranged in a bus bar axial direction, each primary molding bus bar includes an insertion hole into which a support pin for supporting another primary molding bus bar during the primary insert molding is inserted in the bus bar axial direction, and a through hole through which an insulating resin can pass during the secondary insert molding is formed in each secondary molding bus bar in a position opposing the insertion hole.

3 Claims, 21 Drawing Sheets

(51) Int. Cl.
    *H01R 25/00*     (2006.01)
    *H01R 31/00*     (2006.01)
    *H01R 25/16*     (2006.01)
    *H02K 3/52*     (2006.01)
    *B29C 45/14*     (2006.01)
    *B29L 31/34*     (2006.01)
    *B29L 31/00*     (2006.01)
    *B29C 45/16*     (2006.01)

(52) U.S. Cl.
    CPC ....... *B29C 45/14467* (2013.01); *H02K 3/522* (2013.01); *H02K 11/0094* (2013.01); *B29C 45/14311* (2013.01); *B29C 45/14639* (2013.01); *B29C 45/1671* (2013.01); *B29C 2045/14147* (2013.01); *B29C 2045/14327* (2013.01); *B29L 2031/34* (2013.01); *B29L 2031/749* (2013.01); *H02K 2203/09* (2013.01)

(58) Field of Classification Search
    USPC ........................... 310/71, 208; 439/114, 510
    See application file for complete search history.

(56) References Cited

FOREIGN PATENT DOCUMENTS

| | | | |
|---|---|---|---|
| JP | 2007-185038 A | | 7/2007 |
| JP | 2008-199889 A | | 8/2008 |
| JP | 2011-205875 A | | 10/2011 |
| JP | 2012-143019 A | | 7/2012 |
| JP | 2012143019 A | * | 7/2012 |
| JP | 2013-42633 A | | 2/2013 |

* cited by examiner

BUS BAR UNIT

TECHNICAL FIELD

The present invention relates to a bus bar unit connected to a winding of a motor or a power generator.

BACKGROUND ART

JP2011-205875A discloses a bus bar unit in which insulating resin is interposed between three annular bus bars, namely a U phase bus bar, a V phase bus bar, and a W phase bus bar, and the bus bars are laminated in an axial direction of a stator.

SUMMARY OF INVENTION

In this type of bus bar unit, the bus bars are electrically insulated from each other by the insulating resin. However, when the bus bar unit is formed by insert-molding a plurality of bus bars disposed in a die, an air pocket may be formed in the insulating resin during the insert molding process. When an air pocket is formed in the insulating resin between the bus bars, the electrical insulating property between the bus bars of the bus bar unit deteriorates.

An object of the present invention is to provide a bus bar unit in which deterioration of an electrical insulating property between bus bars due to an air pocket can be prevented.

According to an aspect of the present invention, a bus bar unit formed by performing secondary insert molding on a primary molded member, which is formed by performing primary insert molding on a plurality of primary molding bus bars, and a plurality of secondary molding bus bars such that the primary molding bus bars and the secondary molding bus bars are arranged in a bus bar axial direction is provided. In the bus bar unit, each primary molding bus bar includes an insertion hole into which a support pin for supporting another primary molding bus bar during the primary insert molding is inserted in the bus bar axial direction, and a through hole through which an insulating resin can pass during the secondary insert molding is formed in each secondary molding bus bar in a position opposing the insertion hole.

DESCRIPTION OF EMBODIMENTS

An embodiment of the present invention will be described below with reference to the attached figures.

Figure 1:
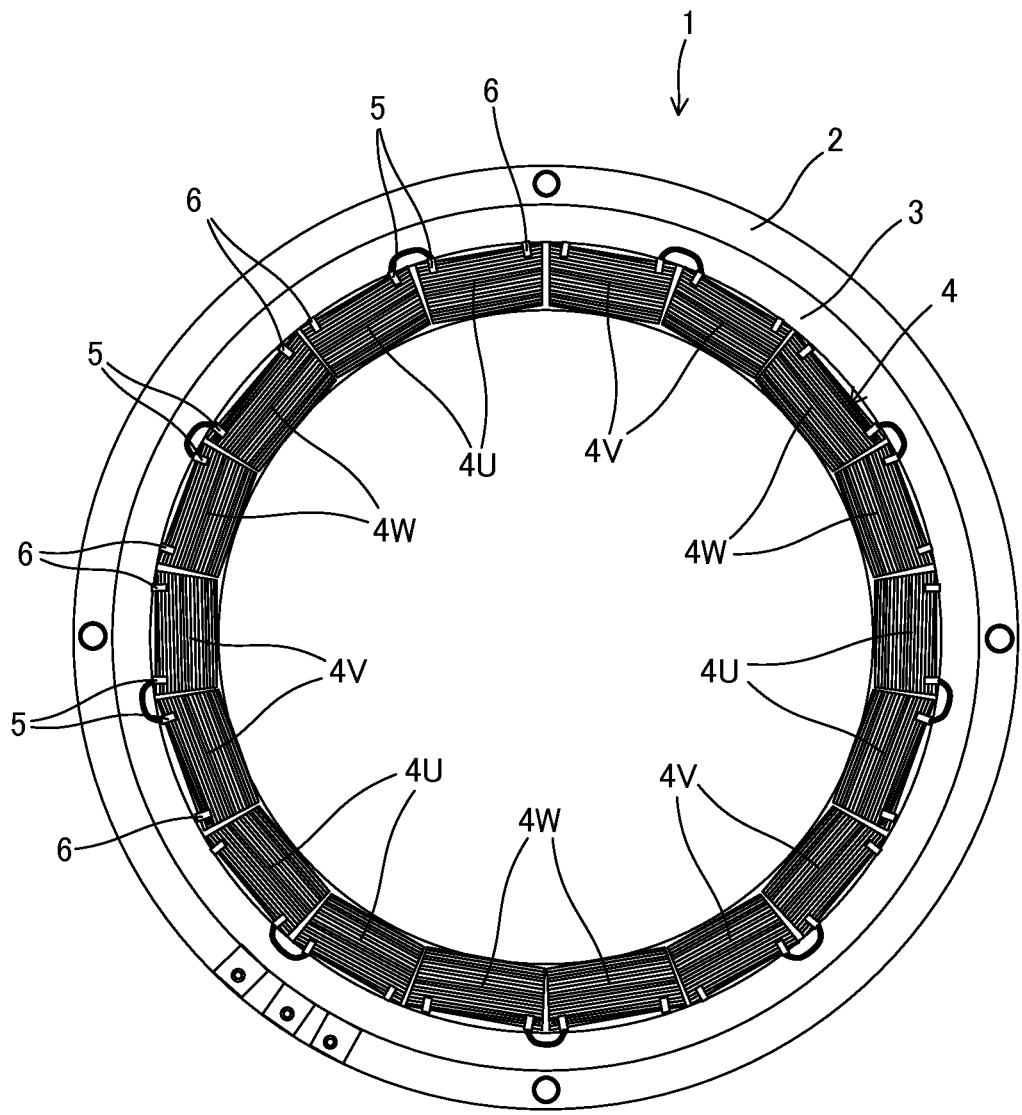
FIG. 1 is a schematic view showing a configuration of a stator composing a three-phase alternating current motor.

FIG. 1 is a view showing a configuration of a stator 1 composing a three-phase alternating current motor.

A plurality of teeth, not shown in the figure, are formed so as to project inwardly on an annular stator core 3 held within a housing 2. Copper wire is wound around each tooth, and coils 4 are composed of the wound conductor wires.

Eighteen coils 4 are disposed on the stator core 3 so as to extend annularly along a circumferential direction of the stator 1. The coils 4 are constituted by U phase coils 4U, V phase coils 4V, and W phase coils 4W, and single sets of two coils 4 of the same phase are disposed at 120 degree intervals in the circumferential direction of the stator 1. Hence, a set of U phase coils 4U, a set of V phase coils 4V, and a set of W phase coils 4W are disposed in that order three times in the circumferential direction of the stator 1.

In adjacent coils 4U, 4V, 4W of the same phase, respective winding terminals 5 are connected to each other. Further, the U phase coils 4U, V phase coils 4V, and W phase coils 4W are connected to a bus bar unit 100 (see FIG. 2) via further winding terminals 6.

Figure 2:
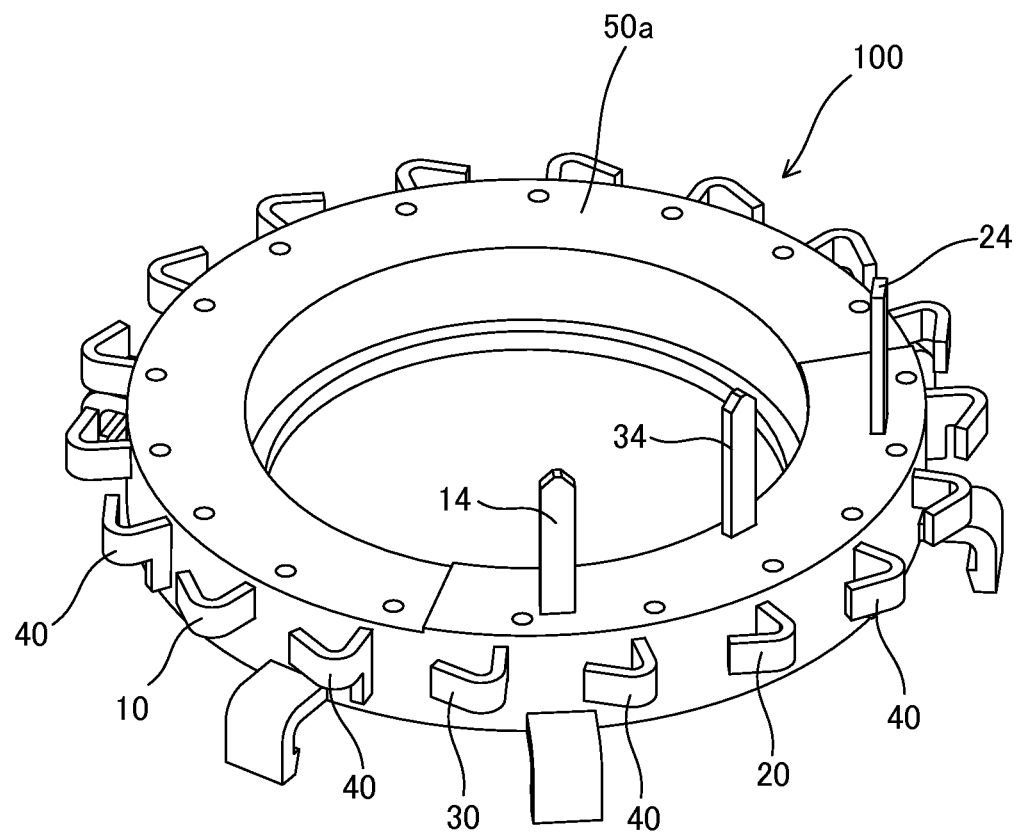
FIG. 2 is a perspective view of a bus bar unit.
Figure 3:
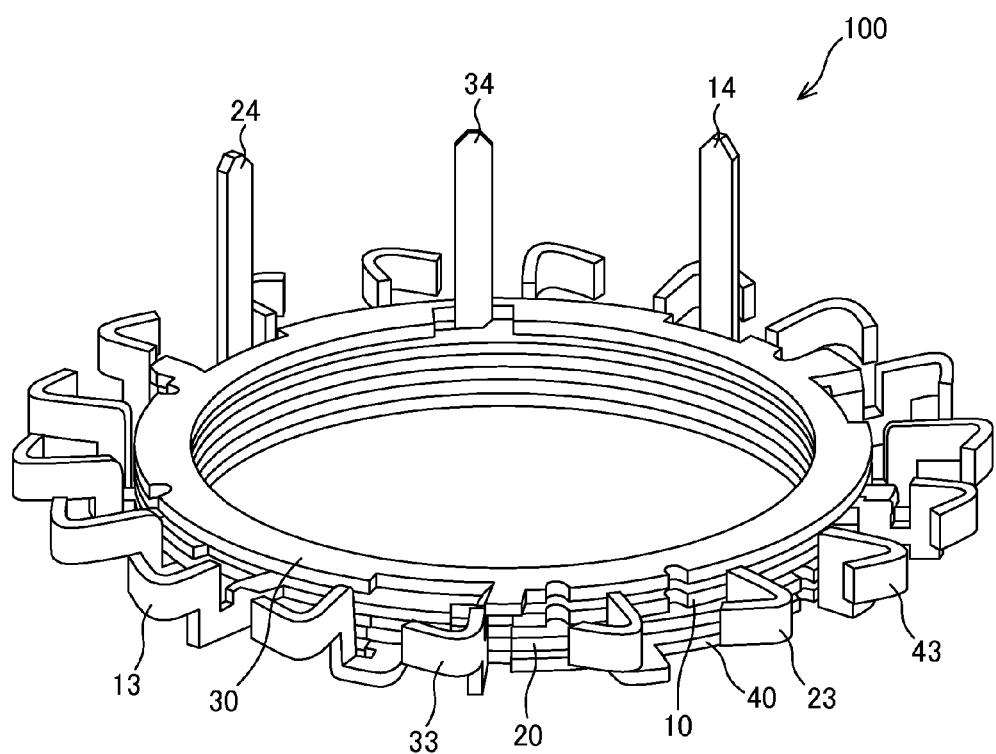
FIG. 3 is a perspective view showing the bus bar unit in a condition where an insulating portion has been omitted.

Referring to FIGS. 2 and 3, the bus bar unit 100, which is provided in a motor, will be described. FIG. 2 is a perspective view of the bus bar unit 100, and FIG. 3 is a perspective view showing the bus bar unit 100 in a condition where an insulating portion 50a has been omitted.

The bus bar unit 100 is attached to an axial direction end portion of the stator 1 (see FIG. 1) concentrically with the stator 1. The bus bar unit 100 includes a U phase bus bar 10 connected to the U phase coils 4U, a V phase bus bar 20 connected to the V phase coils 4V, a W phase bus bar 30 connected to the W phase coils 4W, an N phase bus bar 40 serving as a neutral point bus bar that is connected to the coils 4U, 4V, 4W of the respective phases, and insulating portions 50a that maintain the respective bus bars 10, 20, 30, 40 in an insulated condition.

The bus bar unit 100 is formed integrally by insert-molding the four bus bars 10, 20, 30, 40 described above using insulating resin. The bus bar unit 100 according to this embodiment is manufactured by performing primary insert molding on the U phase bus bar 10 and the V phase bus bar 20 using insulating resin in order to form a primary molded member 200 (see FIG. 13), and then performing secondary insert molding on the primary molded member 200, the W phase bus bar 30, and the N phase bus bar 40 using insulating resin.

Figure 4A:
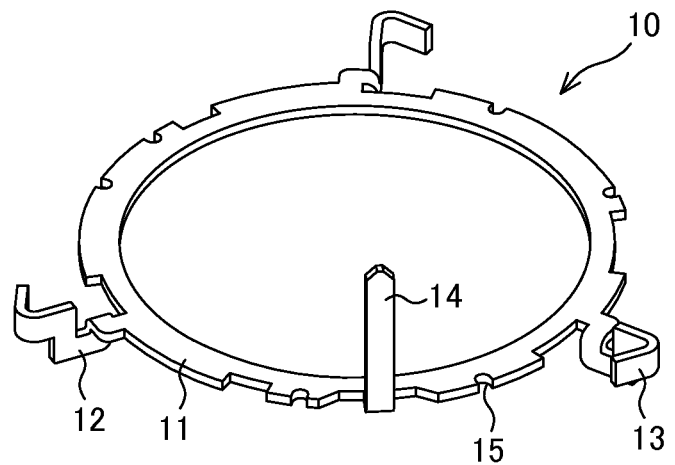
FIG. 4A is a perspective view of a U phase bus bar.
Figure 4B:
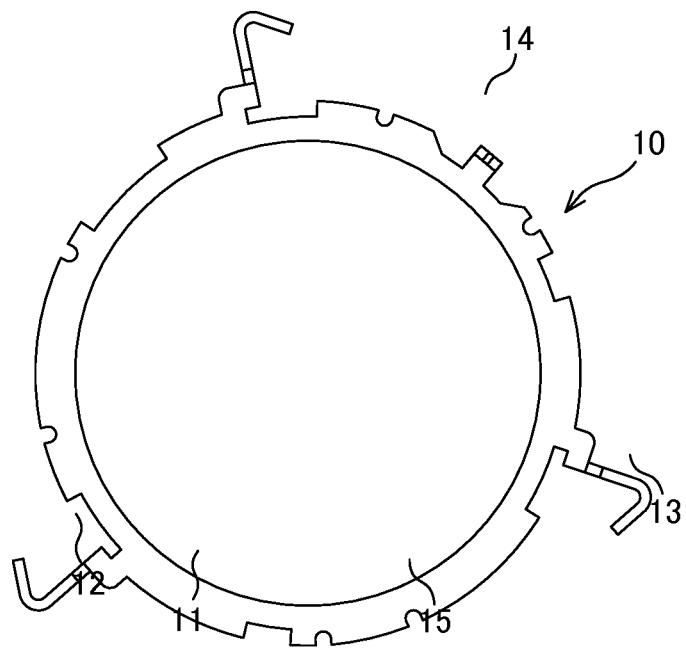
FIG. 4B is a plan view of the U phase bus bar.

As shown in FIGS. 4A and 4B, the U phase bus bar 10 is connected to the winding terminals 6 of the U phase coils 4U.

The U phase bus bar 10 includes a main body portion 11 formed as a plate-shaped annular member, an extending portion 12 extending outward in a bus bar radial direction from the main body portion 11, a coil connecting portion 13 provided on an outside end of the extending portion 12, and a U phase terminal 14 that extends from the main body portion 11 in a bus bar axial direction and is connected to an external wire. The U phase bus bar 10 is formed by performing bending processing or the like on a member punched out from a conductive plate-shaped material.

Three extending portions 12 are provided at equal intervals in a circumferential direction of the main body portion 11. The coil connecting portion 13 is formed in a hook shape on a tip end of the extending portion 12. The coil connecting portions 13 are connected to the winding terminals 6 of the U phase coils 4U.

Figure 5A:
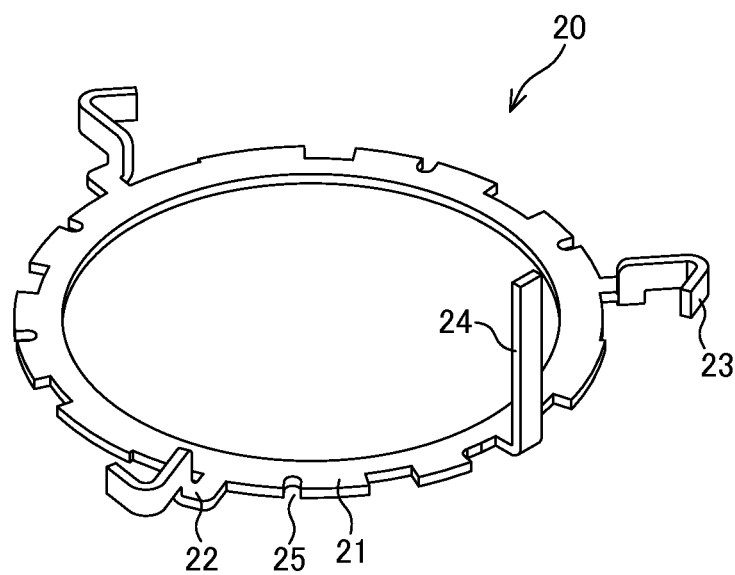
FIG. 5A is a perspective view of a V phase bus bar.
Figure 5B:
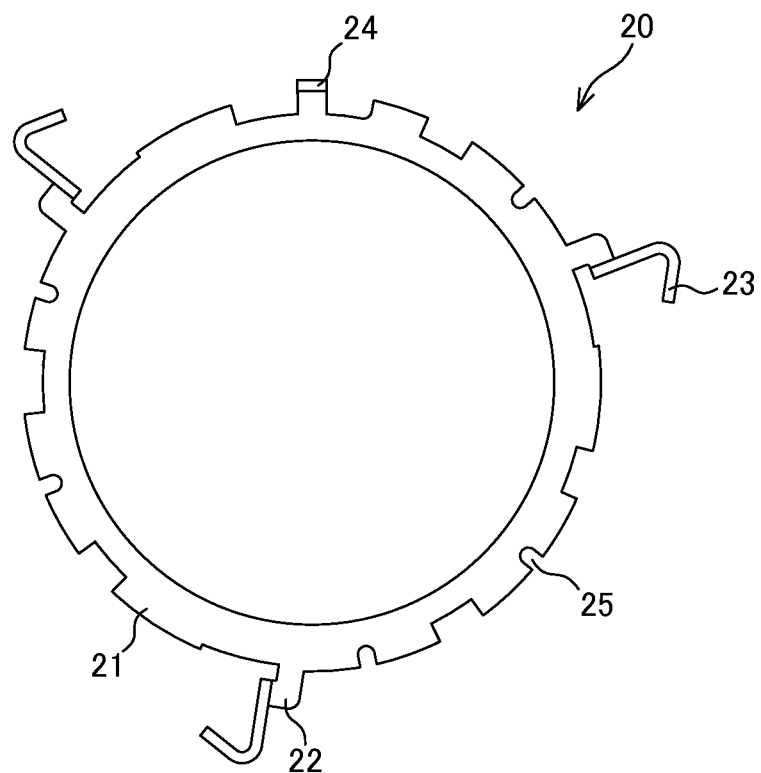
FIG. 5B is a plan view of the V phase bus bar.

As shown in FIGS. 5A and 5B, the V phase bus bar 20 is connected to the winding terminals 6 of the V phase coils 4V.

The V phase bus bar 20 includes a main body portion 21 formed as a plate-shaped annular member, an extending portion 22 extending outward in the bus bar radial direction from the main body portion 21, a coil connecting portion 23 provided on an outside end of the extending portion 22, and a V phase terminal 24 that extends from the main body portion 21 in the bus bar axial direction and is connected to an external wire. The V phase bus bar 20 is formed by performing bending processing or the like on a member punched out from a conductive plate-shaped material.

Three extending portions 22 are provided at equal intervals in a circumferential direction of the main body portion 21. The coil connecting portion 23 is formed in a hook shape on a tip end of the extending portion 22. The coil connecting portions 23 are connected to the winding terminals 6 of the V phase coils 4V.

Figure 6A:
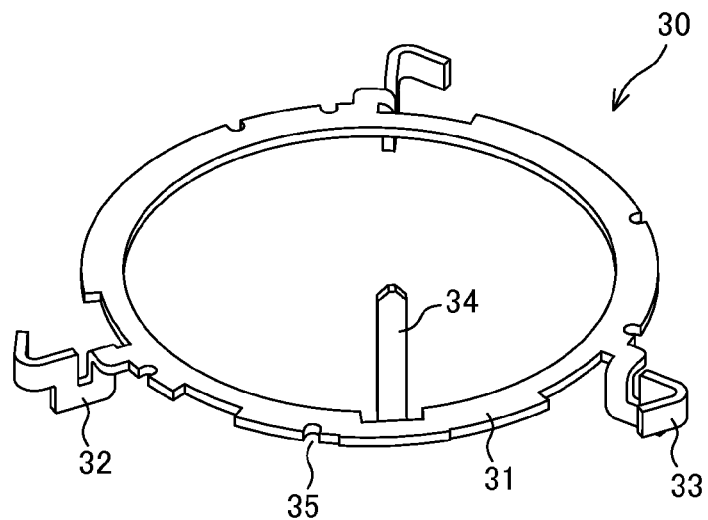
FIG. 6A is a perspective view of a W phase bus bar.
Figure 6B:
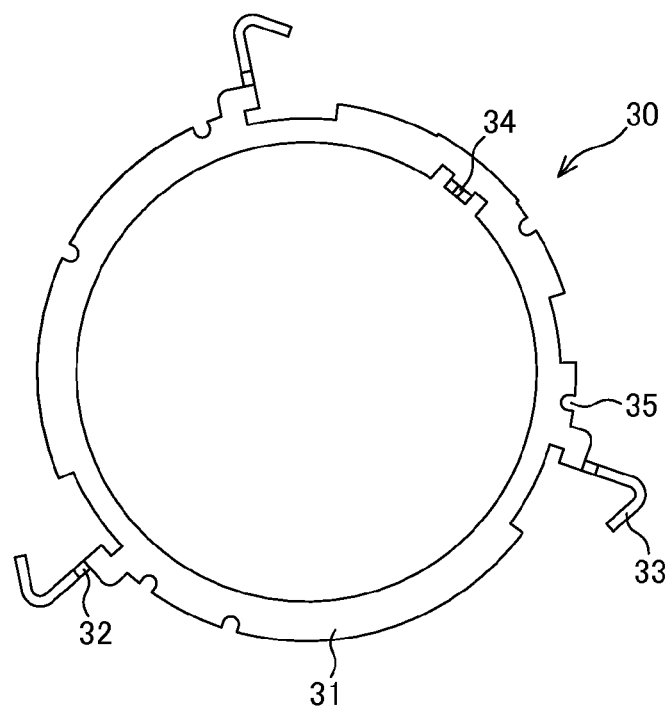
FIG. 6B is a plan view of the W phase bus bar.

As shown in FIGS. 6A and 6B, the W phase bus bar 30 is connected to the winding terminals 6 of the W phase coils 4W.

The W phase bus bar 30 includes a main body portion 31 formed as a plate-shaped annular member, an extending portion 32 extending outward in the bus bar radial direction from the main body portion 31, a coil connecting portion 33 provided on an outside end of the extending portion 32, and a W phase terminal 34 that extends from the main body portion 31 in the bus bar axial direction and is connected to an external wire. The W phase bus bar 30 is formed by performing bending processing or the like on a member punched out from a conductive plate-shaped material.

Three extending portions 32 are provided at equal intervals in a circumferential direction of the main body portion 31. The coil connecting portion 33 is formed in a hook shape on a tip end of the extending portion 32. The coil connecting portions 33 are connected to the winding terminals 6 of the W phase coils 4W.

Figure 7A:
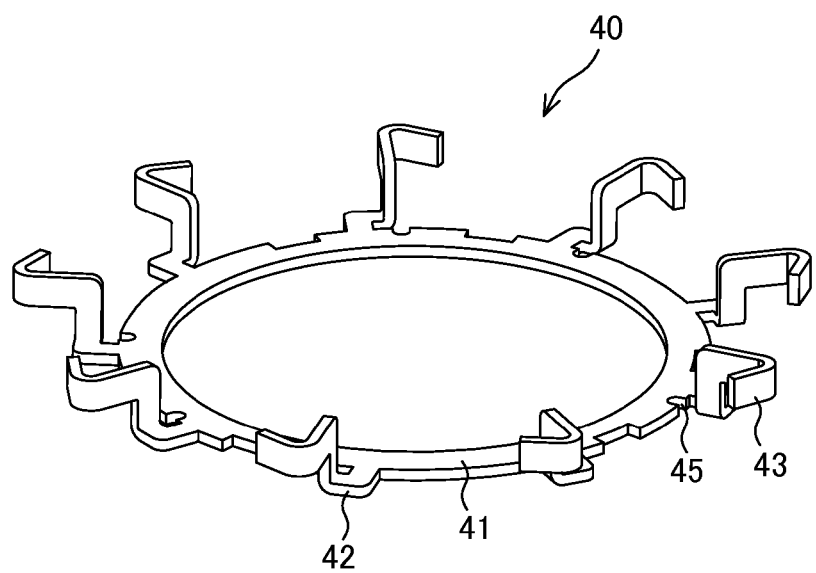
FIG. 7A is a perspective view of an N phase bus bar.
Figure 7B:
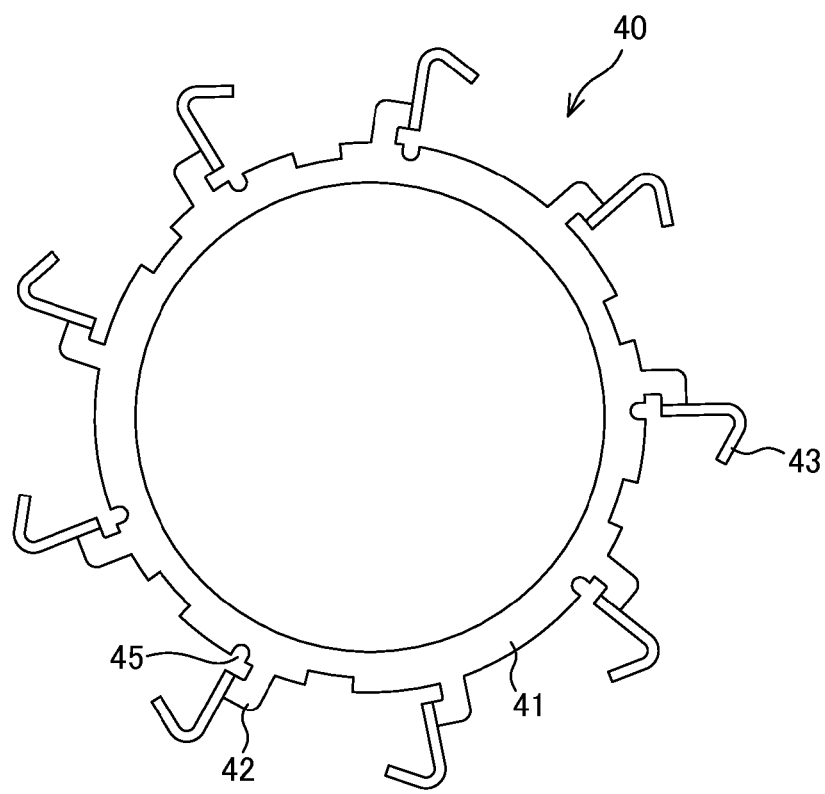
FIG. 7B is a plan view of the N phase bus bar.

As shown in FIGS. 7A and 7B, the N phase bus bar 40 is connected to the winding terminals 6 of the U phase coils 4U, the V phase coils 4V, and the W phase coils 4W.

The N phase bus bar 40 includes a main body portion 41 formed as a plate-shaped annular member, an extending portion 42 extending outward in the bus bar radial direction from the main body portion 41, and a coil connecting portion 43 provided on an outside end of the extending portion 42. The N phase bus bar 40 is formed by performing bending processing or the like on a member punched out from a conductive plate-shaped material.

Nine extending portions 42 are provided at equal intervals in a circumferential direction of the main body portion 41. The coil connecting portion 43 is formed in a hook shape on a tip end of the extending portion 42. The coil connecting portions 43 are connected to the winding terminals 6 of the U phase coils 4U, the winding terminals 6 of the V phase coils 4V, and the winding terminals 6 of the W phase coils 4W.

As shown in FIG. 3, the bus bar unit 100 is comprised of arranging the N phase bus bar 40, the V phase bus bar 20, the U phase bus bar 10, and the W phase bus bar 30 in that order from the stator 1 side. Relative positions of the bus bars 10, 20, 30, 40 in a stator circumferential direction are adjusted such that the extending portions 12, 22, 32, 42 and the coil connecting portions 13, 23, 33, 43 deviate from each other by equal intervals in the stator circumferential direction. The bus bar unit 100 supplies a current supplied from a power supply, not shown in the figures, to the U phase coils 4U, the V phase coils 4V, and the W phase coils 4W via the U phase terminal 14, the V phase terminal 24, and the W phase terminal 34, which serve as external terminals.

Processes for forming the bus bar unit 100 by insert molding will be described below. The bus bar unit 100 is formed by performing secondary insert molding on the primary molded member 200 (see FIG. 13), which is obtained by primary insert molding.

First, referring to FIGS. 8 to 14, the primary insert molding will be described.

Figure 8:
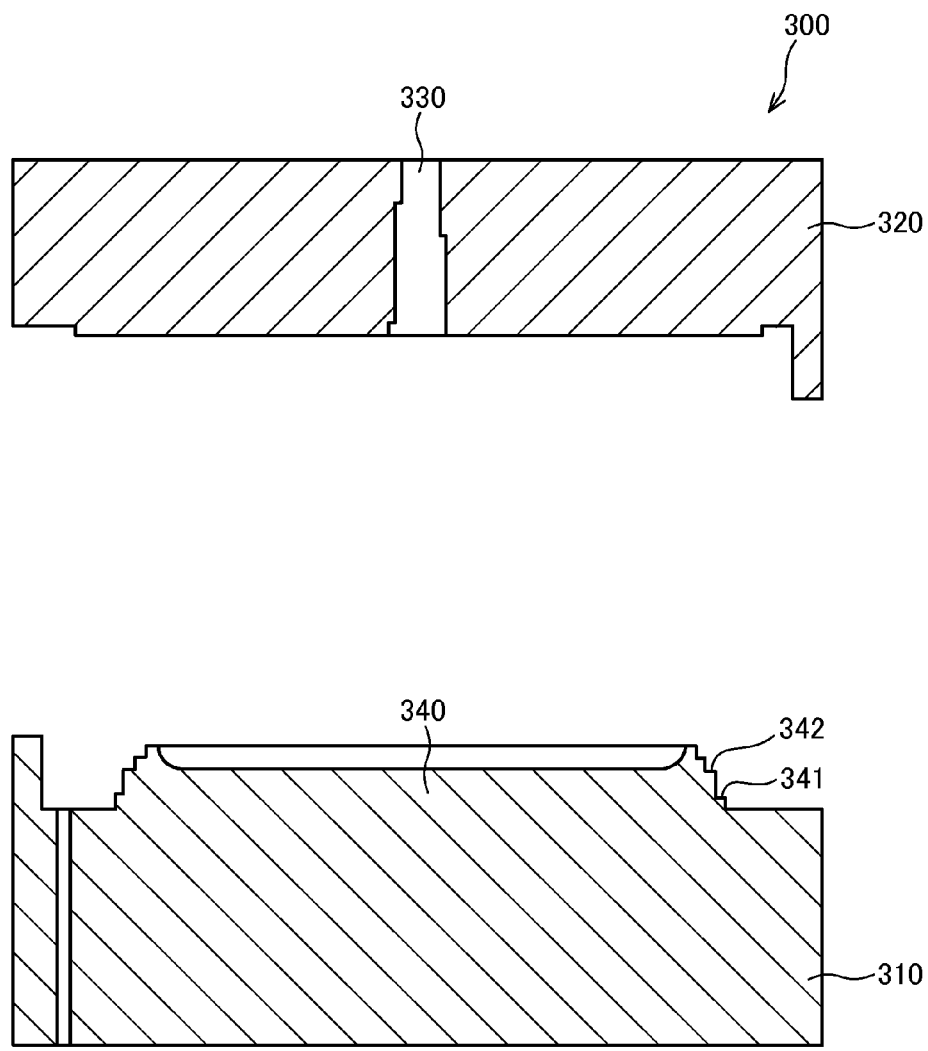
FIG. 8 is a longitudinal sectional view of a first die used during primary insert molding.

In the primary insert molding, the primary molded member 200 (see FIG. 13) is formed using a first die 300 shown in FIG. 8. As shown in FIG. 8, the first die 300 includes a first lower mold 310 disposed on a lower side in a vertical direction, and a first upper mold 320 disposed above the first lower mold 310.

The first upper mold 320 includes an injection hole 330 penetrating the first upper mold 320 in the vertical direction, through which insulating resin is injected into the first die 300.

The first lower mold 310 includes a support portion 340 that projects upward from a bottom surface of the first lower mold 310 in order to support the U phase bus bar 10 and the V phase bus bar 20. The support portion 340 is a columnar projection formed such that an outer diameter thereof decreases in steps from a lower side to an upper side. In other words, the support portion 340 is formed as a stepped member including a first step portion 341 on which an inner peripheral edge of the U phase bus bar 10 is placed, and a second step portion 342 on which an inner peripheral edge of the V phase bus bar 20, which has a smaller inner diameter than the U phase bus bar 10, is placed.

The first step portion 341 and the second step portion 342 are formed as annular planes on which the U phase bus bar 10 and the V phase bus bar 20 can be placed. The second step portion 342 is provided in a higher position than the first step portion 341, and an outer diameter of the second step portion 342 is formed to be smaller than an outer diameter of the first step portion 341.

It should be noted that insertion holes, not shown in the figures, are formed in the first upper mold 320 and the first lower mold 310 of the first die 300 in order to insert the coil connecting portions 13, 23, the U phase and V phase terminals 14, 24, and so on of the U phase bus bar 10 and the V phase bus bar 20.

In the primary insert molding, first, a primary setting process is performed to set the U phase bus bar 10 and the V phase bus bar 20 on the first lower mold 310.

Figure 9:
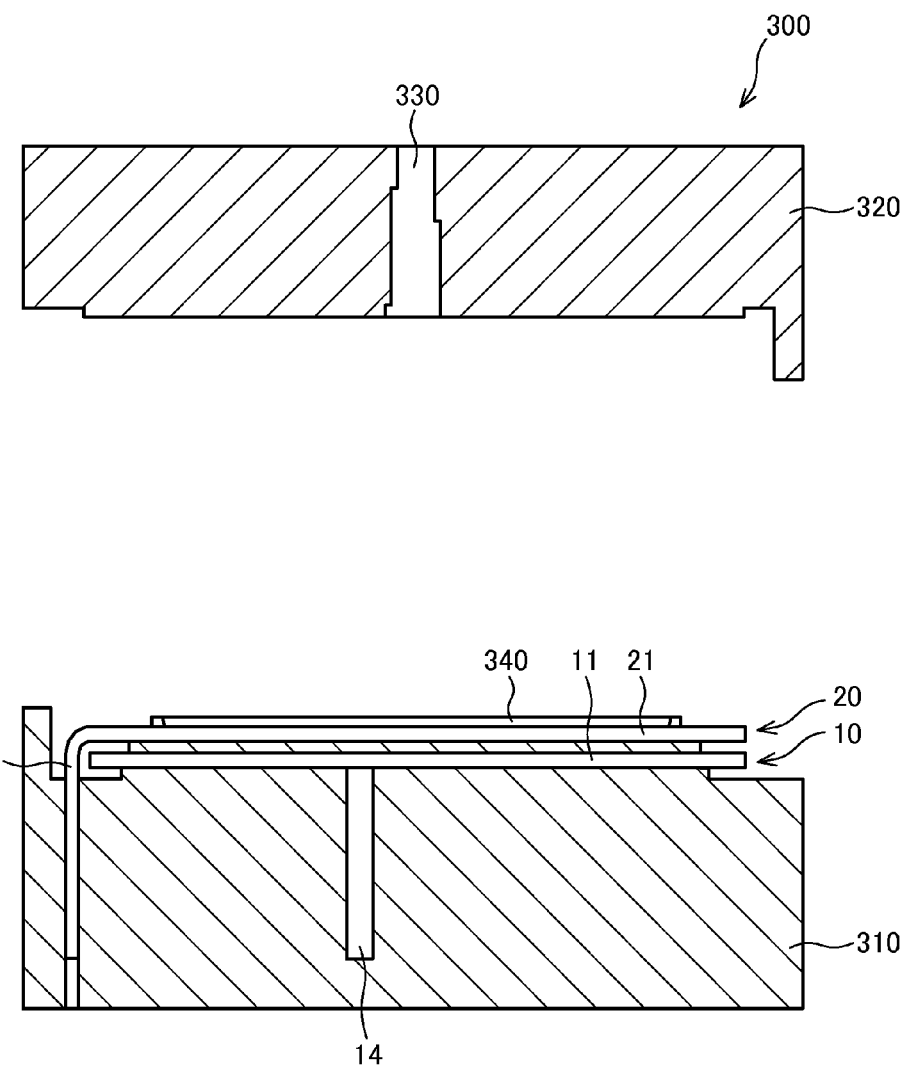
FIG. 9 is a view illustrating a primary setting process of the primary insert molding.

As shown in FIGS. 8 and 9, in the primary setting process, the U phase bus bar 10 is inserted into the support portion 340 of the first lower mold 310, and placed on the first step portion 341 in this condition. The V phase bus bar 20 is then inserted into the support portion 340 of the first lower mold 310 and placed on the second step portion 342. As a result, the U phase bus bar 10 and the V phase bus bar 20 are disposed so as to be separated from each other by a predetermined gap in the bus bar axial direction. It should be noted that in FIG. 9, the extending portions 12, 22, coil connecting portions 13, 23, and so on of the U phase bus bar 10 and the V phase bus bar 20 have been omitted.

Figure 10:
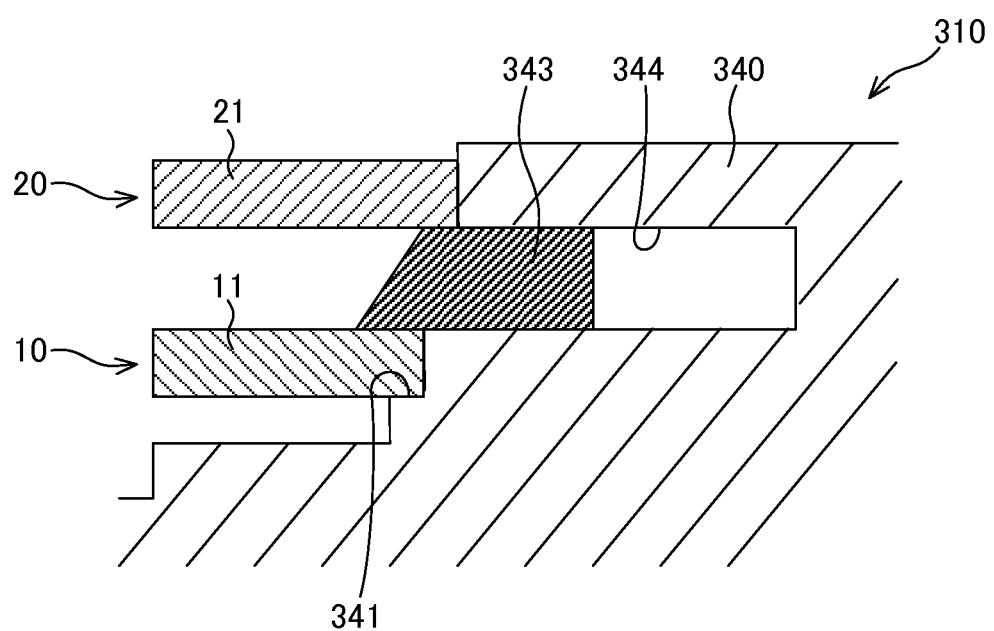
FIG. 10 is an enlarged sectional view showing a support portion of a lower mold of the first die.

As shown in FIG. 10, the support portion 340 of the first lower mold 310 is provided with a gap maintaining member 343 that maintains the bus bar axial direction gap between the U phase bus bar 10 and the V phase bus bar 20 set adjacent to each other on the support portion 340, and a sliding hole 344 through which the gap maintaining member 343 slides.

The sliding hole 344 is provided to extend in a horizontal direction. The gap maintaining member 343 is a plate-shaped member having a pointed tip end, for example, which is disposed in the sliding hole 344 to be capable of moving in a radial direction relative to the support portion 340. Four sets of the gap maintaining member 343 and the sliding hole 344 are provided at equal intervals in a circumferential direction of the support portion 340.

In a normal condition, the gap maintaining member 343 is housed in the sliding hole 344. After the U phase bus bar 10 and the V phase bus bar 20 have been set in the first lower mold 310, the gap maintaining member 343 projects outwardly in the radial direction from the sliding hole 344 so as to be inserted into the gap between the U phase bus bar 10 and the V phase bus bar 20. By inserting the gap maintaining member 343 between the U phase bus bar 10 and the V phase bus bar 20 in this manner, movement of the U phase bus bar 10 and the V phase bus bar 20 in the axial direction due to pressure from the insulating resin injected during insert molding is restricted. As a result, a reduction in the bus bar axial direction gap between the U phase bus bar 10 and the V phase bus bar 20 in the bus bar unit 100 can be prevented. In other words, an insulation distance can be secured between the U phase bus bar 10 and the V phase bus bar 20.

Figure 11:
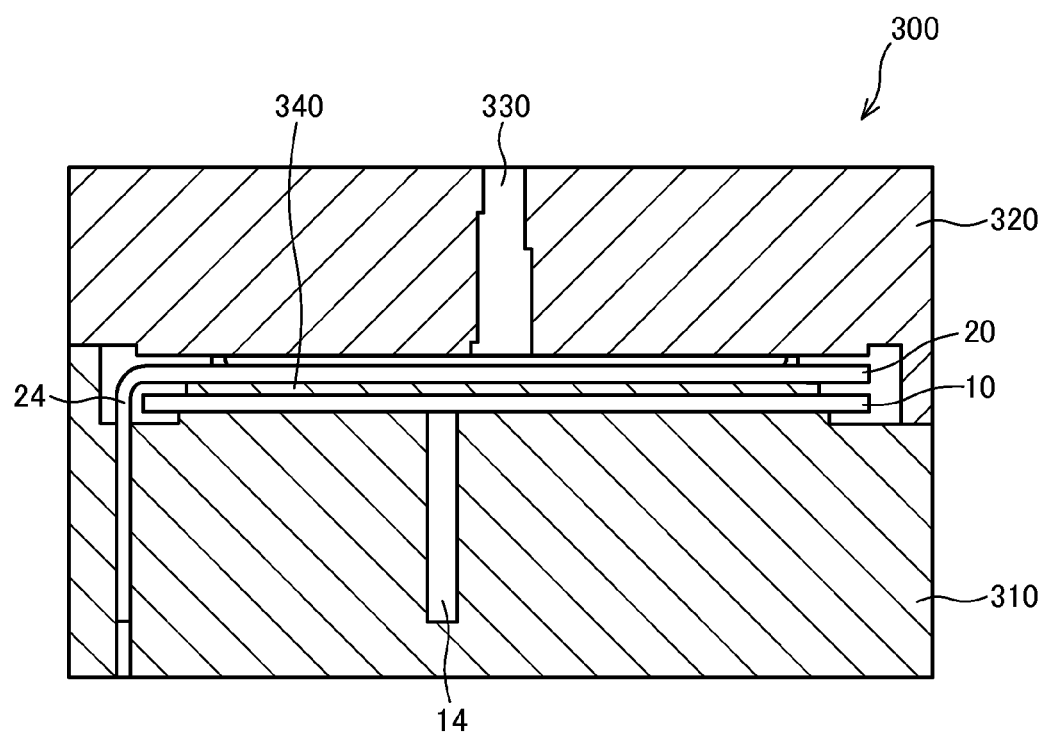
FIG. 11 is a view illustrating a primary molding process of the primary insert molding.

After executing an insertion process to insert the gap maintaining member 343, the first upper mold 320 is closed onto the first lower mold 310, as shown in FIG. 11. It should be noted that in FIG. 11, the extending portions 12, 22 and so on of the U phase bus bar 10 and the V phase bus bar 20 have been omitted.

Figure 12A:
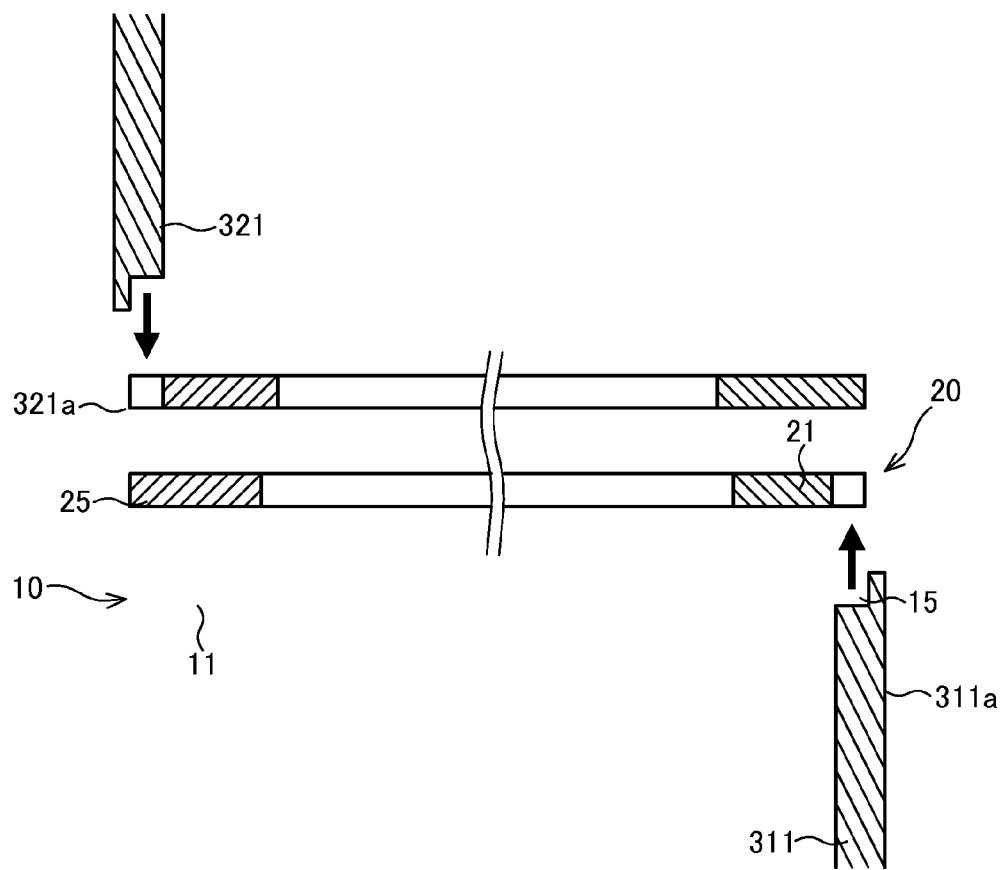
FIG. 12A is a view showing support pins of an upper mold and the lower mold of the first die in a condition where the upper mold is open.

As shown in FIG. 12A, a support pin 311 for supporting the V phase bus bar 20 from below is provided on the first lower mold 310, and a support pin 321 for supporting the U phase bus bar 10 from above is provided on the first upper mold 320. The support pin 311 of the first lower mold 310 projects upwardly from the bottom surface of the first lower mold 310, and is provided in a plurality at predetermined intervals around an outer edge of the V phase bus bar 20. The support pin 321 of the first upper mold 320 projects downwardly from a bottom surface of the first upper mold 320, and is provided in a plurality at predetermined intervals around an outer edge of the U phase bus bar 10.

As shown in FIGS. 4A and 12A, insertion holes 15 are formed in the main body portion 11 of the U phase bus bar 10, and the support pins 311 are inserted into the insertion holes 15 in the bus bar axial direction in order to support the V phase bus bar 20 during the primary insert molding. Further, as shown in FIGS. 5A and 12A, insertion holes 25 are formed in the main body portion 21 of the V phase bus bar 20, and the support pins 321 are inserted into the insertion holes 25 in the bus bar axial direction in order to support the U phase bus bar 10 during the primary insert molding.

Figure 12B:
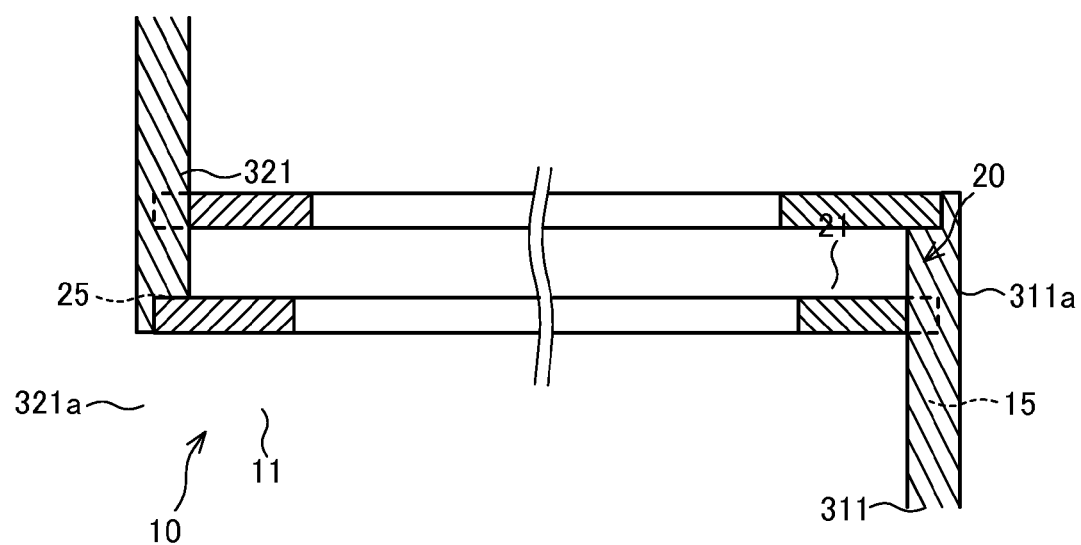
FIG. 12B is a view showing support pins of an upper mold and a lower mold of a second die in a condition where the upper mold is closed.

When the first upper mold 320 is closed, as shown in FIG. 11, tip end parts of the support pins 311 of the first lower mold 310 pass through the insertion holes 15 in the U phase bus bar 10, as shown in FIG. 12B, so as to support the outer edge part of the V phase bus bar 20 from below. At this time, tip end parts of the support pins 321 of the first upper mold 320 pass through the insertion holes 25 in the V phase bus bar 20 so as to support the outer edge part of the U phase bus bar 10 from above. Projections 311a, 321a are formed on the tip end parts of the support pins 311, 321 so as to oppose respective outer peripheral surfaces of the U phase bus bar 10 and the V phase bus bar 20 supported thereby. As a result, movement of the U phase bus bar 10 and the V phase bus bar 20 in the bus bar radial direction during molding is restricted by the projections 311a, 321a.

As shown in FIG. 11, when the first upper mold 320 is closed onto the first lower mold 310, the U phase bus bar 10 and the V phase bus bar 20 are held in a laminated condition while separated by a predetermined gap via the support portion 340 and the support pins 311, 321. In this condition, a primary molding process is performed by injecting molten insulating resin through the injection hole 330 in the first upper mold 320 into a space defined between the first upper mold 320 and the first lower mold 310. At this time, a large force is exerted on the U phase bus bar 10 and the V phase bus bar 20 in the vertical direction by an injection pressure of the insulating resin, but since the gap maintaining member 343 (see FIG. 10) is inserted between the U phase bus bar 10 and the V phase bus bar 20, the gap between the U phase bus bar 10 and the V phase bus bar 20 is maintained at a required predetermined gap for securing an electrical insulating property.

After hardening the insulating resin, the gap maintaining member 343 is housed in the sliding hole 344 in the support portion 340, whereupon the first upper mold 320 and the first lower mold 310 are removed. As a result, the primary molded member 200 shown in FIG. 13 is obtained.

Figure 13:
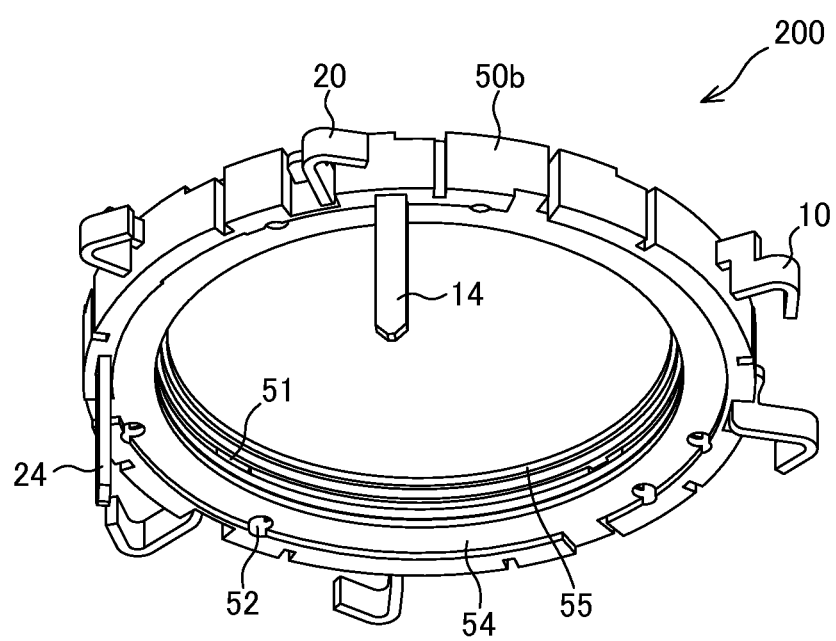
FIG. 13 is a perspective view of a primary molded member composing the bus bar unit.
Figure 14:
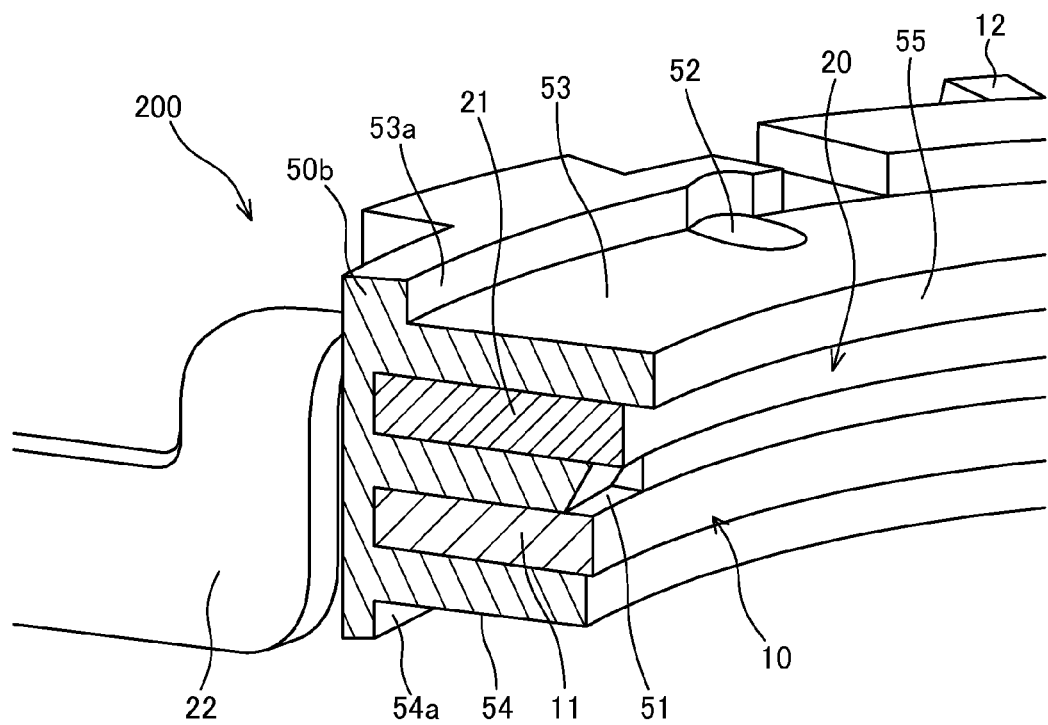
FIG. 14 is a partial longitudinal sectional view of the primary molded member.

As shown in FIGS. 13 and 14, the primary molded member 200 is an integrally molded annular member constituted by the U phase bus bar 10, the V phase bus bar 20, and an insulating portion 50b. The insulating portion 50b of the primary molded member 200 is formed when the insulating resin injected in the primary molding process hardens. A hole 51 corresponding to the gap maintaining member 343 and holes 52 corresponding to the support pins 311, 321 are formed in the insulating portion 50b of the primary molded member 200.

As shown in FIG. 14, a first housing recessed portion 53 used in the secondary insert molding to house the N phase bus bar 40 is formed in one axial direction end of the insulating portion 50b of the primary molded member 200, and a second housing recessed portion 54 used in the secondary insert molding to house the W phase bus bar 30 is formed in another axial direction end of the insulating portion 50*b*. Further, an inner peripheral surface 55 close to one end of the insulating portion 50*b* is formed to have a smaller inner diameter than respective inner peripheral surfaces of the U phase bus bar 10 and the V phase bus bar 20. In other words, the primary molded member 200 is configured such that the inner peripheral surface 55 on one end side of the insulating portion 50*b* is positioned the most inward.

The first housing recessed portion 53, second housing recessed portion 54, and inner peripheral surface 55 of the insulating portion 50*b* of the primary molded member 200 are formed in the primary molding process of the primary insert molding.

Next, referring to FIGS. 15 to 19, the secondary insert molding will be described.

Figure 15:
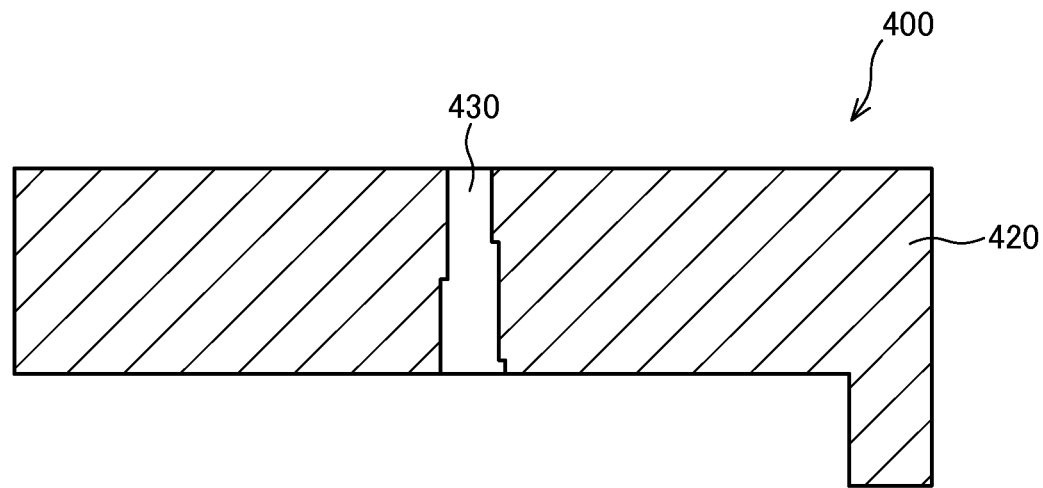
FIG. 15 is a longitudinal sectional view of the second die used during secondary insert molding.
Figure 15:
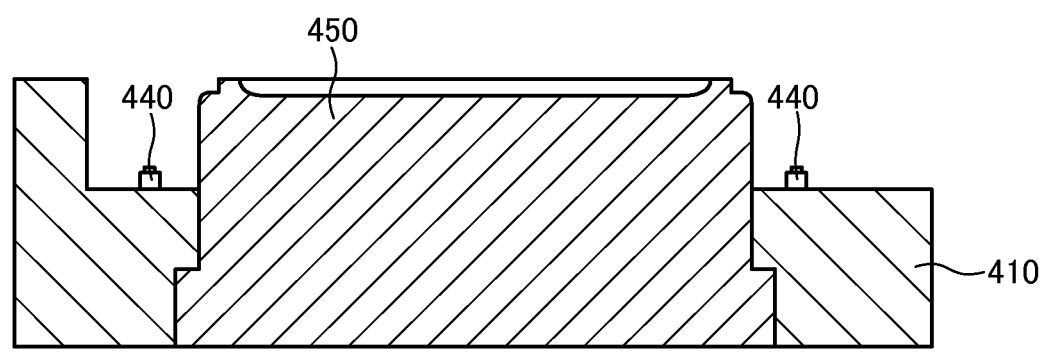

In the secondary insert molding, the bus bar unit 100 is formed using a second die 400 shown in FIG. 15. As shown in FIG. 15, the second die 400 includes a second lower mold 410 disposed on a lower side in the vertical direction, and a second upper mold 420 disposed above the second lower mold 410.

The second upper mold 420 includes an injection hole 430 penetrating the second upper mold 420 in the vertical direction, through which insulating resin is injected into the second die 400.

The second lower mold 410 includes a support pin 440 for supporting the W phase bus bar 30 from below, and a shaft portion 450 for positioning the primary molded member 200 in the radial direction.

The support pin 440 projects upward from a bottom surface of the second lower mold 410, and is provided in a plurality at predetermined intervals around an outer edge of the W phase bus bar 30. The shaft portion 450 is formed as a columnar member that projects upward from the bottom surface of the second lower mold 410.

It should be noted that insertion holes, not shown in the figures, are formed in the second upper mold 420 and the second lower mold 410 in order to insert the coil connecting portions 13, 23, 33, 43, the respective terminals 14, 24, 34, and so on of the U to N phase bus bars 10, 20, 30, 40.

Figure 16A:
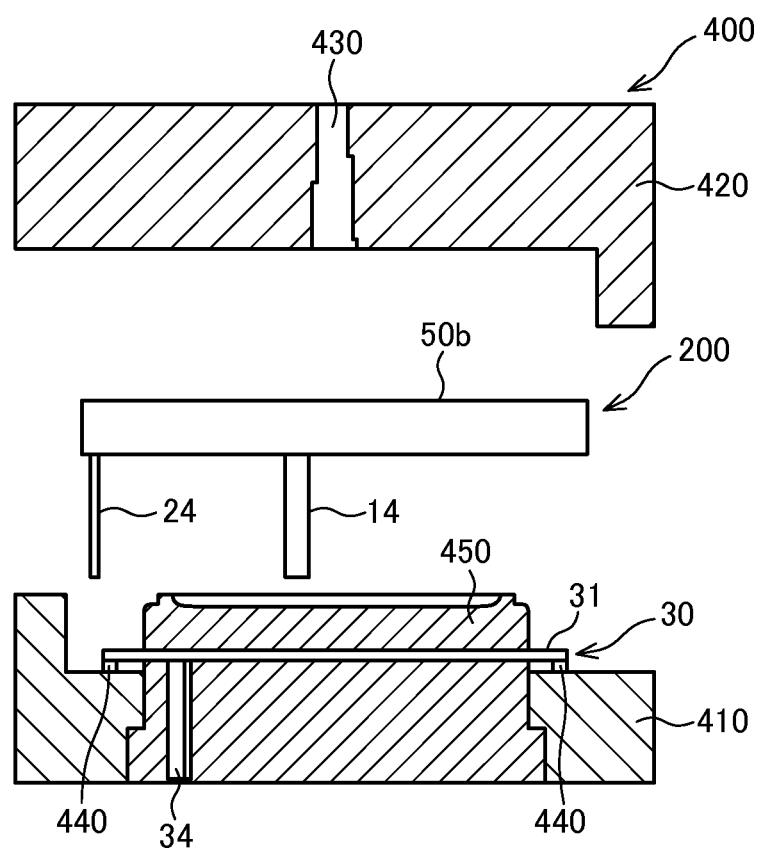
FIG. 16A is a view illustrating a first half of a secondary setting process of the secondary insert molding.
Figure 16B:
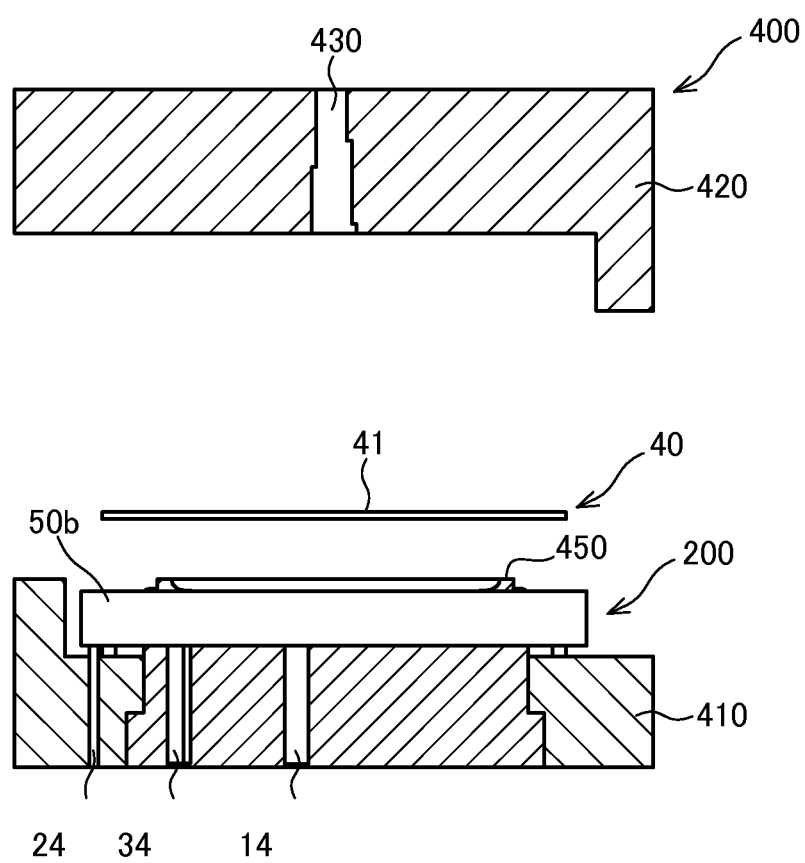
FIG. 16B is a view illustrating a second half of the secondary setting process of the secondary insert molding.

In the secondary insert molding, as shown in FIGS. 16A and 16B, a secondary setting process is performed to set the W phase bus bar 30, the N phase bus bar 40, and the primary molded member 200 on the second lower mold 410. It should be noted that in FIGS. 16A and 16B, the coil connecting portions 13, 23, 33, 43, and so on of the U to N phase bus bars 10, 20, 30, 40 have been omitted.

As shown in FIG. 16A, in the secondary setting process, the W phase bus bar 30 is inserted into the shaft portion 450 of the second lower mold 410, and placed on the support pins 440 in this condition. The annular primary molded member 200 is then inserted into the shaft portion 450 of the second lower mold 410 and placed on the W phase bus bar 30.

The inner peripheral surface 55 (see FIG. 14) of the insulating portion 50*b* of the primary molded member 200 is formed to be capable of sliding against the shaft portion 450 of the second lower mold 410, and therefore, by disposing the primary molded member 200 in the shaft portion 450 in a condition where the inner peripheral surface 55 of the insulating portion 50*b* contacts an outer peripheral surface of the shaft portion 450 during the second setting process, a radial direction position of the primary molded member 200 within the second die 400 is set.

As shown in FIG. 16B, with the primary molded member 200 set on the second lower mold 410, the W phase bus bar 30 is housed in the second housing recessed portion 54 in the insulating portion 50*b* of the primary molded member 200. At this time, an outer peripheral surface of the W phase bus bar 30 contacts an inner peripheral surface 54*a* (see FIG. 14) of the second housing recessed portion 54 positioned on an outer side of the W phase bus bar 30. By disposing the W phase bus bar 30 so as to be housed in the second housing recessed portion 54, movement of the W phase bus bar 30 in the radial direction during the insert molding is restricted.

Figure 17:
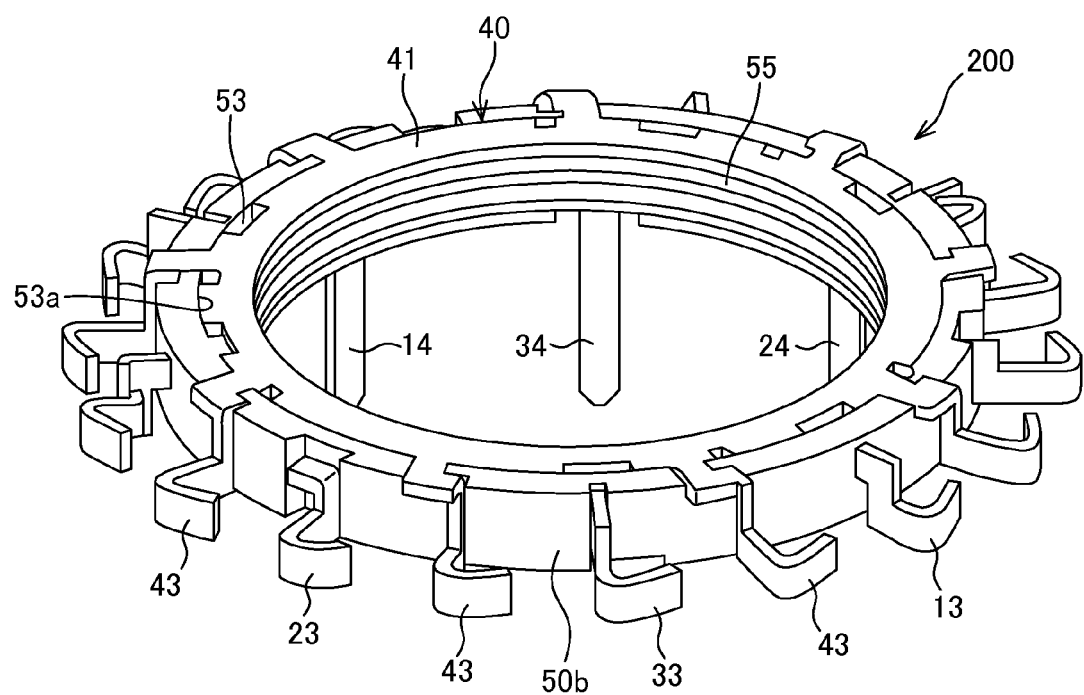
FIG. 17 is a perspective view showing the primary molded member in which a W phase bus bar and an N phase bus bar are disposed.

After setting the primary molded member 200, the N phase bus bar 40 is placed on the primary molded member 200. With the N phase bus bar 40 placed on the primary molded member 200, as shown in FIG. 17, the N phase bus bar 40 is housed in the first housing recessed portion 53 in the insulating portion 50*b* of the primary molded member 200. At this time, an outer peripheral surface of the N phase bus bar 40 contacts an inner peripheral surface 53*a* of the first housing recessed portion 53 positioned on an outer side of the N phase bus bar 40. By disposing the N phase bus bar 40 so as to be housed in the first housing recessed portion 53, movement of the N phase bus bar 40 in the radial direction during the insert molding is restricted.

Figure 18:
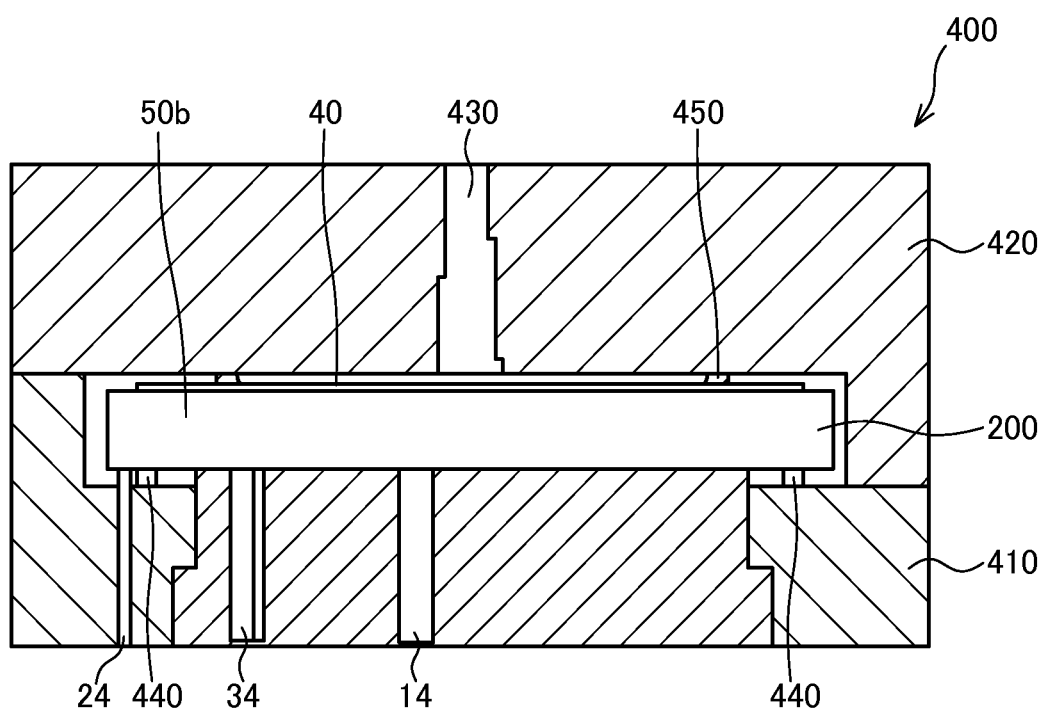
FIG. 18 is a view illustrating a secondary molding process of the second insert molding.

After executing the second setting process described above, the second upper mold 420 is closed onto the second lower mold 410, as shown in FIG. 18. Next, the secondary molding process is performed by injecting molten insulating resin through the injection hole 430 in the second upper mold 420 into a space defined between the second upper mold 420 and the second lower mold 410. It should be noted that in FIG. 18, the coil connecting portions 13, 23, 33, 43 and so on of the U to N phase bus bars 10, 20, 30, 40 have been omitted.

After the insulating resin injected into the second die 400 during the secondary molding process has hardened, the second upper mold 420 and the second lower mold 410 are removed, whereby the annular bus bar unit 100 shown in FIG. 2 is obtained. The insulating portion 50*a* of the bus bar unit 100 is formed when the insulating resin injected in the secondary molding process hardens.

In this embodiment, as described above, the bus bar unit 100 is formed integrally by performing the secondary insert molding on the primary molded member 200. The hole 51 corresponding to the gap maintaining member 343 and the holes 52 corresponding to the support pins 311, 321 are formed in the insulating portion 50*b* of the primary molded member 200, but during the secondary insert molding, the insulating resin flows into the holes 51, 52 so that the holes 51, 52 are filled with the insulating resin.

In the primary molded member 200, the holes 52 corresponding to the support pins 311, 321 open onto an end surface of the insulating portion 50*b* provided with the first housing recessed portion 53 and the second housing recessed portion 54. Hence, when the N phase bus bar 40 and the W phase bus bar 30 are disposed in the first housing recessed portion 53 and the second housing recessed portion 54 during the secondary insert molding, the openings of the holes 52 are blocked by the main body portion 41 of the N phase bus bar 40 and the main body portion 31 of the W phase bus bar 30. If the secondary insert molding is performed in a condition where the holes 52 are blocked, the insulating resin does not flow into the holes 52, and as a result, the holes 52 remain as air pockets in the interior of the bus bar unit 100. The electrical insulating property of air is poorer than the electrical insulating property of the insulating resin, and therefore, when air pockets are formed in the interior of the bus bar unit 100 in this manner, the electrical insulating property between the bus bars deteriorates.

Figure 19:
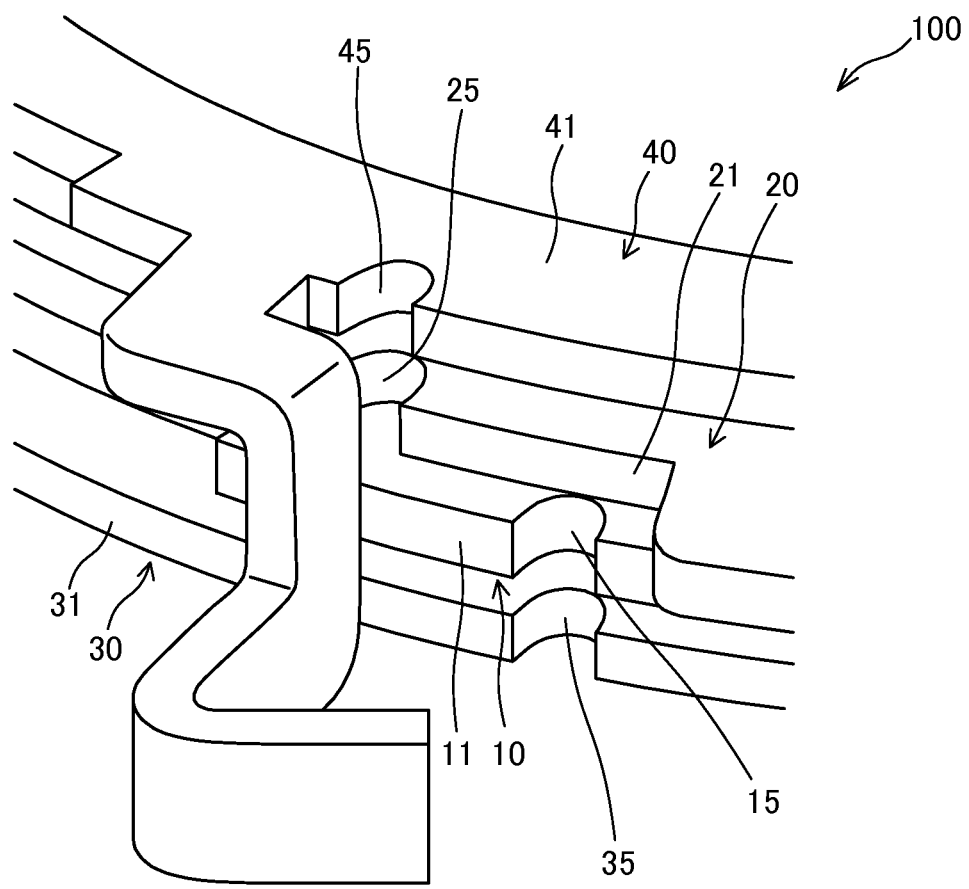
FIG. 19 is a partially enlarged perspective view showing the bus bar unit in a condition where the insulating portion has been omitted.

Hence, as shown in FIGS. 6B and 19, through holes 35 through which the insulating resin can pass during the secondary insert molding are formed in the main body portion 31 of the W phase bus bar 30 in positions opposing the insertion holes 15 in the U phase bus bar 10, or in other words positions corresponding to the holes 52 in the insulating portion 50b that correspond to the support pins 311 (see FIG. 12A). The through holes 35 are provided in the W phase bus bar 30 in an identical number to the number of insertion holes 15 in the U phase bus bar 10.

Further, as shown in FIGS. 7B and 19, through holes 45 through which the insulating resin can pass during the secondary insert molding are formed in the main body portion 41 of the N phase bus bar 40 in positions opposing the insertion holes 25 in the V phase bus bar 20, or in other words positions corresponding to the holes 52 in the insulating portion 50b that correspond to the support pins 321 (see FIG. 12A). The through holes 45 are provided in the N phase bus bar 40 in an identical number to the number of insertion holes 25 in the V phase bus bar 20.

By setting the W phase bus bar 30 and the N phase bus bar 40 in the secondary setting process of the secondary insert molding such that the holes 52 in the primary molded member 200 are aligned with the through holes 35 in the W phase bus bar 30 and the through holes 45 in the N phase bus bar 40, the insulating resin can flow into the holes 52 in the primary molded member 200 through the through holes 35, 45 during the secondary molding process. As a result, the formation of air pockets in the interior of the bus bar unit 100 obtained by the secondary insert molding can be prevented.

It should be noted that during the primary insert molding, the U phase bus bar 10 is supported by the support pins 321 passing through the insertion holes 25 in the V phase bus bar 20, and the V phase bus bar 20 is supported by the support pins 311 passing through the insertion holes 15 in the U phase bus bar 10, and therefore the U phase bus bar 10 and the V phase bus bar 20 are disposed such that the positions of the insertion holes 15, 25 deviate from each other in the bus bar circumferential direction. During the secondary insert molding, the W phase bus bar 30 is disposed such that the through holes 35 are aligned with the insertion holes 15 in the U phase bus bar 10, and the N phase bus bar 40 is disposed such that the through holes 45 are aligned with the insertion holes 25 in the V phase bus bar 20. Hence, as shown in FIG. 19, the insertion holes 15 in the U phase bus bar 10 and the through holes 35 in the W phase bus bar 30 deviate from the insertion holes 25 in the V phase bus bar 20 and the through holes 45 in the N phase bus bar 40 in the bus bar circumferential direction.

According to the embodiment described above, following effects are obtained.

In this embodiment, the primary insert molding is performed in a condition where the gap maintaining member 343 is inserted between the U phase bus bar 10 and the V phase bus bar 20 set on the support portion 340 of the first die 300, and therefore movement of the U phase bus bar 10 and the V phase bus bar 20 in the bus bar axial direction due to the pressure of the insulating resin injected during molding is restricted. Accordingly, the bus bar axial direction gap between the U phase bus bar 10 and the V phase bus bar 20 can be maintained at a fixed gap, and as a result, an insulation distance can be secured between the bus bars.

After forming the primary molded member 200 by performing the primary insert molding on the U phase bus bar 10 and the V phase bus bar 20, the secondary insert molding is performed on the primary molded member 200, the W phase bus bar 30, and the N phase bus bar 40. As a result, an improvement in molding precision can be achieved such that a gap between the U phase bus bar 10 and the W phase bus bar 30 and a gap between the V phase bus bar 20 and the N phase bus bar 40 can be maintained at fixed gaps.

In the primary insert molding, the U phase bus bar 10 is placed on the first step portion 341 of the support portion 340, whereupon the V phase bus bar 20, which has a smaller inner diameter than the U phase bus bar 10, is placed on the second step portion 342 of the support portion 340. Therefore, the U phase bus bar 10 and the V phase bus bar 20 can easily be disposed in the first die 300 so as to be separated from each other in the bus bar axial direction.

The inner peripheral surface 55 of the insulating portion 50b of the primary molded member 200 is formed to be capable of sliding against the shaft portion 450 of the second lower mold 410 of the second die 400, and therefore, by inserting the shaft portion 450 into the primary molded member 200 during the secondary insert molding, a radial direction position of the primary molded member 200 within the second die 400 can be set. As a result, the molding precision of the bus bar unit 100 can be improved.

The N phase bus bar 40 and the W phase bus bar 30, when set in the second die 400, are housed in the first housing recessed portion 53 and the second housing recessed portion 54 of the primary molded member 200, and therefore movement of the N phase bus bar 40 and the W phase bus bar 30 in the bus bar radial direction due to the pressure of the insulating resin injected during the molding is restricted. As a result, the molding precision of the bus bar unit 100 can be improved.

The U phase bus bar 10 used in the primary insert molding includes the insertion holes 15 into which the support pins 311 are inserted, and the V phase bus bar 20 includes the insertion holes 25 into which the support pins 321 are inserted. Further, in the W phase bus bar 30 used in the secondary insert molding, the through holes 35 through which the insulating resin can pass are provided in positions opposing the insertion holes 15 in the U phase bus bar 10, and in the N phase bus bar 40, the through holes 45 through which the insulating resin can pass are provided in positions opposing the insertion holes 25 in the V phase bus bar 20. Hence, when the secondary insert molding is performed on the primary molded member 200 having the holes 52 corresponding to the support pins 311, 321, the insulating resin can flow into the holes 52 through the through holes 35, 45 in the W phase bus bar 30 and the N phase bus bar 40. Accordingly, air pockets can be prevented from forming in the interior of the bus bar unit 100 obtained in the secondary insert molding. As a result, deterioration of the electrical insulating property between the bus bars caused by air pockets can be avoided.

The insertion holes 15 in the U phase bus bar 10 and the through holes 35 in the W phase bus bar 30 are disposed to deviate from the insertion holes 2 in the V phase bus bar 20 and the through holes 45 in the N phase bus bar 40 in the bus bar circumferential direction, and therefore interference between the support pins 311, 321 when supporting the U phase bus bar 10 and the V phase bus bar 20 during the primary insert molding can be prevented.

An embodiment of the present invention was described above, but the above embodiment is merely one example of an application of the present invention, and the technical scope of the present invention is not limited to the specific configurations of the above embodiment.

In this embodiment, the bus bar unit 100 is applied to a motor, but the bus bar unit 100 may also be applied to a power generator.

In this embodiment, the U phase bus bar 10, V phase bus bar 20, W phase bus bar 30, and N phase bus bar 40 are annular, but may be arc-shaped.

Further, in this embodiment, a three-phase alternating current motor including the eighteen coils 4 was cited as an example, but the number of coils is not limited thereto.

Furthermore, in the bus bar unit 100 according to this embodiment, the N phase bus bar 40, the V phase bus bar 20, the U phase bus bar 10, and the W phase bus bar 30 are disposed in that order from the stator side, but the bus bars 10, 20, 30, 40 may be arranged in a different order. In this case, a primary molded member is composed of performing primary insert molding on the two bus bars disposed centrally in the bus bar axial direction, whereupon a bus bar unit is composed of performing secondary insert molding on the primary molded member and the remaining two bus bars.

This application claims priority based on JP application number 2013-47252, filed with the Japan Patent Office on Mar. 8, 2013, the entire contents of which are incorporated into this specification by reference.

The invention claimed is:

1. A bus bar unit formed by performing secondary insert molding on a primary molded member, which is formed by performing primary insert molding on a plurality of primary molding bus bars, and a plurality of secondary molding bus bars such that the primary molding bus bars and the secondary molding bus bars are arranged in a bus bar axial direction,
   wherein each primary molding bus bar includes an insertion hole into which a support pin for supporting another primary molding bus bar during the primary insert molding is inserted in the bus bar axial direction, and
   a through hole through which an insulating resin can pass during the secondary insert molding is formed in each secondary molding bus bar in a position opposing the insertion hole.

2. The bus bar unit as defined in claim 1, wherein the plurality of primary molding bus bars are comprised of a first bus bar and a second bus bar,
   the plurality of secondary molding bus bars are comprised of a third bus bar disposed on a first bus bar side end portion of the primary molded member, and a fourth bus bar disposed on a second bus bar side end portion of the primary molded member,
   the first bus bar includes a first bus bar insertion hole into which a support pin for supporting the second bus bar during the primary insert molding is inserted,
   the second bus bar includes a second bus bar insertion hole into which a support pin for supporting the first bus bar during the primary insert molding is inserted,
   a third bus bar through hole through which the insulating resin can pass during the secondary insert molding is formed in the third bus bar in a position opposing the first bus bar insertion hole, and
   a fourth bus bar through hole through which the insulating resin can pass during the secondary insert molding is formed in the fourth bus bar in a position opposing the second bus bar insertion hole.

3. The bus bar unit as defined in claim 2, wherein the first bus bar insertion hole and the third bus bar through hole are disposed to deviate from the second bus bar insertion hole and the fourth bus bar through hole in a bus bar circumferential direction.

* * * * *